US010621143B2

(12) United States Patent
Khurange et al.

(10) Patent No.: US 10,621,143 B2
(45) Date of Patent: Apr. 14, 2020

(54) METHODS AND SYSTEMS OF A DEDUPE FILE-SYSTEM GARBAGE COLLECTION

(71) Applicants: Ashish Govind Khurange, Pune (IN); Kulangara Kuriakose George, Pune (IN); Sachin Baban Durge, Pune (IN); Kuldeep Sureshrao Nagarkar, Pune (IN); Ravender Goyal, Saratoga, CA (US)

(72) Inventors: Ashish Govind Khurange, Pune (IN); Kulangara Kuriakose George, Pune (IN); Sachin Baban Durge, Pune (IN); Kuldeep Sureshrao Nagarkar, Pune (IN); Ravender Goyal, Saratoga, CA (US)

( * ) Notice: Subject to any disclaimer, the term of this patent is extended or adjusted under 35 U.S.C. 154(b) by 735 days.

(21) Appl. No.: 14/615,434

(22) Filed: Feb. 6, 2015

(65) Prior Publication Data

US 2016/0232177 A1    Aug. 11, 2016

(51) Int. Cl.
*G06F 16/174* (2019.01)
*G06F 12/02* (2006.01)
*G06F 11/14* (2006.01)

(52) U.S. Cl.
CPC ...... *G06F 16/1752* (2019.01); *G06F 11/1448* (2013.01); *G06F 12/0253* (2013.01); *G06F 11/1453* (2013.01); *G06F 2201/825* (2013.01)

(58) Field of Classification Search
CPC .......... G06F 17/30174; G06F 12/0253; G06F 11/1451; G06F 17/30085; G06F 17/30159; G06F 17/0159; G06F 16/1752; G06F 11/1448; G06F 16/174; G06F 12/02; G06F 11/14
See application file for complete search history.

(56) References Cited

U.S. PATENT DOCUMENTS

| | | | | |
|---|---|---|---|---|
| 6,393,440 | B1 * | 5/2002 | Salant ................. | G06F 12/0269 |
| 7,634,517 | B1 * | 12/2009 | Burrows .............. | G06F 16/316 |
| 7,769,792 | B1 * | 8/2010 | Burrows ................ | G06F 16/93 |
| | | | | 707/814 |
| 8,301,671 | B1 * | 10/2012 | Greenwood ........ | G06F 11/2094 |
| | | | | 707/813 |
| 9,342,525 | B1 * | 5/2016 | Wideman ............ | G06F 16/1752 |
| 9,671,960 | B2 * | 6/2017 | Patel ..................... | G06F 3/0608 |
| 9,740,704 | B2 * | 8/2017 | Slater ................ | G06F 17/30156 |

(Continued)

*Primary Examiner* — Robert W Beausoliel, Jr.
*Assistant Examiner* — Susan F Rayyan

(57) ABSTRACT

In one embodiment, a computer-implemented method of implementing a dedupe file system with constant ingestion and retrieval times for objects in dedupe file system achieved by synchronizing a garbage collection (GC) thread and reader (restore), writer (backup) threads in a dedupe file system includes generating, with at least one processor, a state machine for dedupe file system that coordinates concurrent data ingestion due to writers and data deletion due to garbage collector. The state machine has three states. "Dormant" state when the GC thread is inactive and all writers freely ingest data into dedupe file system without any need for synchronization with GC. "Data gathering" state when the GC thread determines the dedupe chunks for deletion in a garbage list and writers check for data chunks in the garbage list and filters out processed data.

2 Claims, 9 Drawing Sheets

(56) References Cited

U.S. PATENT DOCUMENTS

| | | | |
|---|---|---|---|
| 2001/0054057 A1* | 12/2001 | Long | G06F 9/52 718/108 |
| 2008/0281886 A1* | 11/2008 | Petrank | G06F 12/0269 |
| 2010/0088277 A1* | 4/2010 | Rao | G06F 17/30038 707/637 |
| 2011/0016095 A1* | 1/2011 | Anglin | G06F 11/1453 707/692 |
| 2012/0109895 A1* | 5/2012 | Zwilling | G06F 11/1471 707/648 |
| 2012/0150823 A1* | 6/2012 | Tofano | G06F 17/30336 707/692 |
| 2012/0150954 A1* | 6/2012 | Tofano | G06F 9/5066 709/204 |
| 2013/0055278 A1* | 2/2013 | Zaitsev | G06F 12/0253 718/104 |
| 2013/0091102 A1* | 4/2013 | Nayak | G06F 3/0613 707/692 |
| 2014/0149794 A1* | 5/2014 | Shetty | H04L 67/1095 714/20 |
| 2014/0189040 A1* | 7/2014 | Gero | H04L 67/06 709/213 |
| 2014/0189270 A1* | 7/2014 | Iwanicki | G06F 3/0619 711/162 |
| 2014/0344216 A1* | 11/2014 | Abercrombie | G06F 17/30575 707/609 |
| 2015/0026391 A1* | 1/2015 | Su | G06F 12/0246 711/103 |
| 2016/0077926 A1* | 3/2016 | Mutalik | G06F 11/1456 711/162 |
| 2016/0188372 A1* | 6/2016 | Sarkar | G06F 9/45516 718/103 |
| 2016/0203197 A1* | 7/2016 | Rastogi | G06F 17/30563 707/602 |
| 2016/0283372 A1* | 9/2016 | Davis | G06F 12/0261 |
| 2017/0123678 A1* | 5/2017 | Singhai | G06F 3/0608 |
| 2017/0322878 A1* | 11/2017 | Wang | G06F 12/0253 |

\* cited by examiner

```
┌─────────────────────────────────────────────────────────────┐
│ WHILE IN THE DATA DELETION STATE, A BACKUP THREAD, WHILE    │
│ PROCESSING AN ONGOING BACKUP, CAN ENCOUNTER AN EXISTING     │
│ DATA CHUNK                                                  │
│ 402                                                         │
└─────────────────────────────────────────────────────────────┘
                              │
                              ▼
┌─────────────────────────────────────────────────────────────┐
│ BACKUP THREAD ACQUIRES A 'READ' LOCK ON THE DATA CHUNK FILE │
│ 404                                                         │
└─────────────────────────────────────────────────────────────┘
                              │
                              ▼
┌─────────────────────────────────────────────────────────────┐
│ BACKUP THREAD ADDS A HARDLINK TO THE DATA CHUNK FILE IN A   │
│ TEMPORARY LOCATION                                          │
│ 406                                                         │
└─────────────────────────────────────────────────────────────┘
                              │
                              ▼
┌─────────────────────────────────────────────────────────────┐
│ IF THE READ LOCK IS GRANTED IN DELAYED MODE AND GC HAS      │
│ DELETED IT, DATA CHUNK IS TREATED AS A 'NEW' DATA CHUNK     │
│ CREATED IN THE DEDUPE FILE SYSTEM.                          │
│ 408                                                         │
└─────────────────────────────────────────────────────────────┘
                              │
                              ▼
┌─────────────────────────────────────────────────────────────┐
│ GC THREAD ITERATES THE ERASER DATABASE. FOR EVERY DATA      │
│ CHUNK IN THE DATABASE                                       │
│ 410                                                         │
└─────────────────────────────────────────────────────────────┘
                              │
                              ▼
┌─────────────────────────────────────────────────────────────┐
│ GC ACQUIRES WRITE LOCK AND CHECK THE LINK COUNT OF DATA     │
│ CHUNK, IF IT IS 1, GC THREAD REMOVES THE CHUNK              │
│ 412                                                         │
└─────────────────────────────────────────────────────────────┘
                              │
                              ▼
┌─────────────────────────────────────────────────────────────┐
│ GC THREAD ITERATES THE EXPIREDBI DATABASE. FOR EVERY BACKUP │
│ IMAGE REMOVE THE CORRESPONDING METADATA INFORMATION FROM    │
│ THE DEDUPE FILE SYSTEM.                                     │
│ 414                                                         │
└─────────────────────────────────────────────────────────────┘

METHODS AND SYSTEMS OF A DEDUPE FILE-SYSTEM GARBAGE COLLECTION

BACKGROUND

1. Field

This application relates generally to data storage, and more specifically to a system, article of manufacture and method of dedupe file-system garbage collection.

2. Related Art

In case of a dedupe file system, garbage data chunks should be periodically removed to recycle the storage space. A garbage collector functionality (GC) can be implemented to clean out detected garbage data chunks. For example, a GC can use a reference counting mechanism. One drawback of reference counting is that it increases the new file creation time because reference count for each of the chunk included in the file needs to be incremented. This further needs serialization between multiple writers processing the same chunk. This serialization needs overhead of locking mechanism for reference counting. As a result, the overall backup window can be increased. Accordingly, alternatives to the reference-counting mechanism can be implemented to minimize the impact on the backup window.

BRIEF SUMMARY OF THE INVENTION

In one embodiment, a computer-implemented method of implementing a dedupe file system with constant ingestion and retrieval times for objects in dedupe file system achieved by synchronizing a garbage collection (GC) thread and reader (restore), writer (backup) threads in a dedupe file system includes generating, with at least one processor, a state machine for dedupe file system that coordinates concurrent data ingestion due to writers and data deletion due to garbage collector. The state machine has three states. "Dormant" state when the GC thread is inactive and all writers freely ingest data into dedupe file system without any need for synchronization with GC. "Data gathering" state when the GC thread determines the dedupe chunks for deletion in a garbage list and writers check for data chunk in the garbage list and filters out processed data. "Data deletion" state when the GC thread deletes the data in garbage list and writers check for data chunk in the garbage list and protect relevant data.

BRIEF DESCRIPTION OF THE DRAWINGS

FIG. 4 illustrates an example data deletion process, according to some embodiments.

Figure 1:
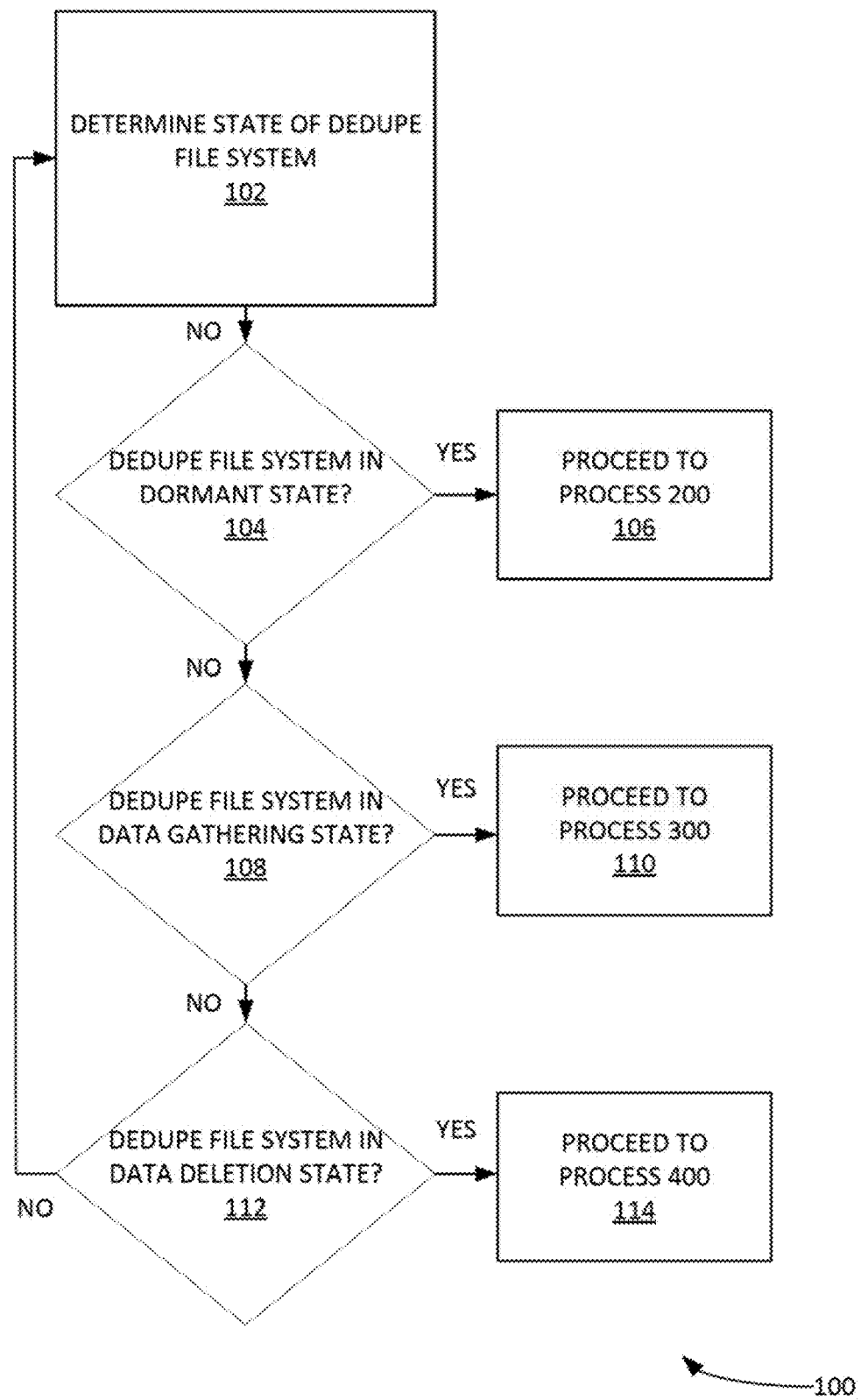
FIG. 1 illustrates an example method of dedupe file system garbage collection, according to some embodiments.

The Figures described above are a representative set, and are not an exhaustive with respect to embodying the invention.

DESCRIPTION

Disclosed are a system, method, and article of manufacture of dedupe file-system garbage collection. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Example definitions for some embodiments are now provided.

Application server can be, inter alia, a software framework that provides a generalized approach to creating an application-server implementation, regard to what the application functions are and/or the server portion of a specific implementation instance. The server's function can be dedicated to the execution of procedures (e.g. programs, routines, scripts) for supporting its applied applications. An application server can be an example of a physical server.

A backup, or the process of backing up, can refer to the copying and/or archiving of computer data so it may be used to restore the original after a data loss event.

Backup window period of time when backups are permitted to run on a system

Chunk can be the segments of data that are generated from a data stream by splitting the data stream at fixed or variable lengths. A chunk can be a specified fixed size or variable size.

Cloud computing can be computing that can involve a large number of computers connected through a communication network such as the Internet. Cloud computing can be a form of distributed computing over a network, and can include the ability to run a program or application on many connected computers at the same time.

Cloud storage can be a model of networked enterprise storage where data is stored in virtualized pools of storage which are generally hosted by third parties. Hosting companies can operate large data centers, and users can have data hosted by leasing storage capacity from said hosting companies. Physically, the resource can span across multiple servers and multiple locations.

Continuous data protection (CDP) can be backup of computer data by automatically saving a copy of every change made to that data. It allows the user or administrator to restore data to any point in time.

Data deduplication can be a technique for reducing the amount of storage space (e.g. eliminating duplicate copies of data).

Garbage data chunk can be a data chunk that is not referred to by any existing file.

Garbage collection (GC) can be a form of automatic memory management. The garbage collector, or just collector, attempts to reclaim garbage, or memory occupied by objects that are no longer in use by a program.

Exemplary Methods

In one embodiment, a GC can determine a list of garbage data chunks to clean up from the data store of the dedupe file system. The GC can be implemented without interrupting various system operations such as, inter alia: backup, restore, cloud upload, and/or cloud download jobs. The GC can be implemented without a reference counting mechanism. Accordingly, the list of garbage data chunks cannot remain static over the lifetime of the GC. Ongoing backups, restores, cloud uploads, and cloud downloads can have run time impacts on the list of garbage data chunks. The GC can handle these storage dynamics by cleaning up the garbage data chunks that are not more referred to by a backup image on the data storage of the dedupe file system. Processes 100, 200, 300, 400, 500, 600, 700 and 800 can be utilized to clean the garbage data chunks without interrupting other system operations.

FIG. 1 illustrates an example method 100 of dedupe file system garbage collection, according to some embodiments. In step 102, the dedupe file system state can be determined. The dedupe file system can be an entity that has states associated with it. The backup, restore, and GC threads can be actors with decision logic driven by the state of said dedupe file system. In some examples, the backup and/or restore threads can be passive actors. In other words, the backup and/or restore threads do not change the state of the dedupe file system. The GC thread can be an active actor. Implementing, the GC thread can changes the state of the dedupe file system.

In some embodiments, the dedupe file system can have the following states associated with it: dormant, data gathering and deletion. A dormant state indicates that the GC thread is sleeping. The data gathering state indicates that the GC thread is generating list of garbage data chunks. The data deletion state indicates that the GC thread is cleaning up garbage data chunks.

Accordingly, it can be determined that dedupe file system is in a dormant state in step 104. If dedupe file system is in a dormant state, then process 100 can proceed to step 106. In step 106, process 200 can be implemented. When the dedupe file system is in dormant state, only backup and restore threads are active. Hence there are no conflicts between the data backup, data restore and garbage collection operations. If dedupe file system is not in a dormant state, then process 100 can proceed to step 108.

It can be determined that dedupe file system is in a data-gathering state in step 108. If dedupe file system is in a data-gathering state, then process 100 can proceed to step 110. In step 110, process 300 can be implemented. If dedupe file system is not in a data-gathering state, then process 100 can proceed to step 112.

It can be determined that dedupe file system is in a data-deleting state in step 112. If dedupe file system is in a data-deleting state, then process 100 can proceed to step 114. In step 114, process 400 can be implemented. If dedupe file system is not in a data-gathering state, then process 100 can end (e.g. go into sleep state) and/or return to step 102.

Figure 2:
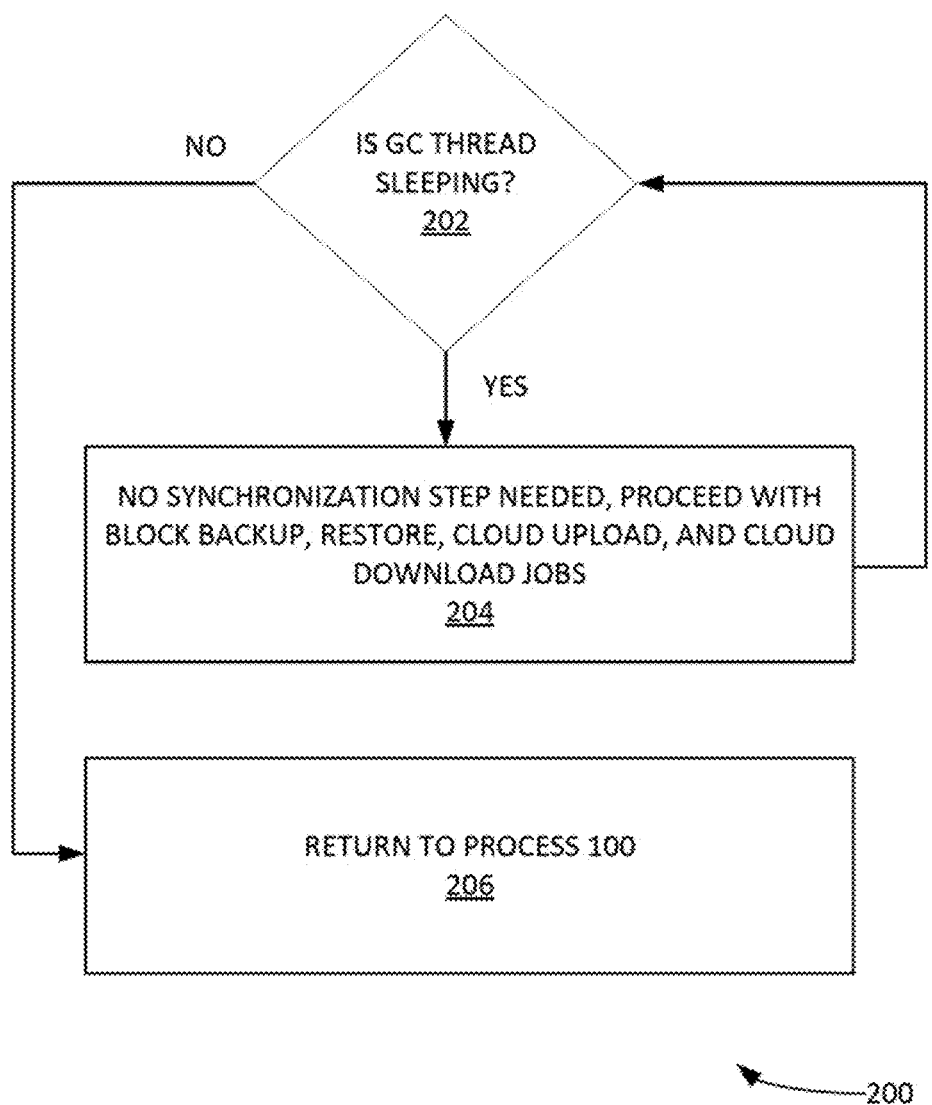
FIG. 2 illustrates an example dormant state dedupe-filing system process, according to some embodiments.

FIG. 2 illustrates an example dormant state dedupe-filing system process 200, according to some embodiments. In step 202 of process 200, it can be determined whether the GC thread is sleeping? If yes, process 200 can continue to step 204. If no, a synchronization algorithm may be implemented and/or process 200 can return to process 100 for determining a current state of the dedupe filing system in step 206. If no, then process 200 can continue to step 204. In step 204, no synchronization step is needed as the GC thread is not active. Accordingly, conflicts between the GC thread and other threads are not possible. The dedupe filing system can proceed with implementing other threads such as, inter alia: backup and/or restore threads and/or other file system operations.

Figure 3:
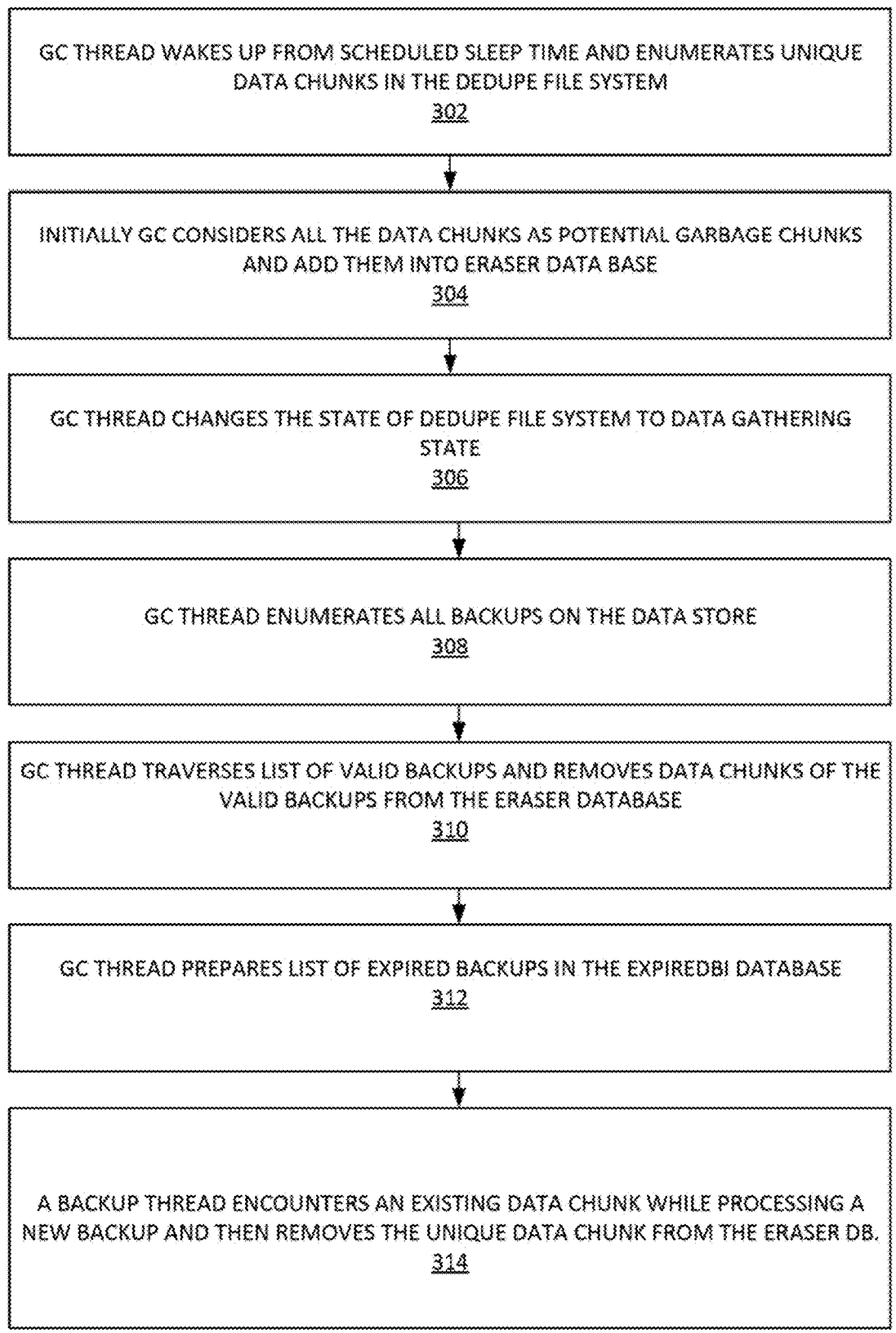
FIG. 3 illustrates an example data gathering process, according to some embodiments.

Proceeding to FIGS. 3 and 4, it is noted that when the dedupe file system is in a data gathering or data deletion state, then backup threads and GC thread are active at the same time. Hence in those states data backup and garbage collection operations are in conflicting operations. When a backup thread is processing a data chunk for the first time, then for the new data chunk backup thread and GC thread are not in conflict. This is because the new data chunk can never exist in the garbage data chunk list. When a backup thread is processing a chunk which already exists in the dedupe file system, then for that already existing chunk backup thread and GC thread are in conflict. This is because the data chunk may be included in the garbage data chunk list. As a consequence the backup thread can perform operations to preserve said data chunk while the GC thread can perform operations to clean up said data chunk. In summary backup threads and GC thread are in conflicting operations only when GC thread is running and backup thread is processing an already existing chunk. Various algorithms can be implemented to synchronize this conflicting situation such as process 500 infra.

FIG. 3 illustrates an example data gathering process 300, according to some embodiments. A data gathering state indicates that the GC thread is generating a list of garbage data chunks. In step 302, the GC thread wakes up from scheduled sleep time and enumerates unique data chunks in the dedupe file system. At this step the dedupe file system is in a dormant state, so behavior of the backup threads is unchanged. In step 304, the GC thread prepares an eraser database with list of all data chunks in dedupe file system. GC considers all the data chunks as potential garbage chunks. In step 306, the GC thread changes the state of dedupe file system to data gathering state. In step 308, the GC thread enumerates all backups on the data store. In step 310, the GC thread traverses list of valid backups and removes data chunks of the valid backups from the eraser database. In step 312, the GC thread can prepare a list of expired backups in the ExpiredBI database database. In step 314, while processing a new backup, a backup thread encounters an existing data chunk. While in the data gathering state, the backup thread removes that unique data chunk from the GC's eraser database. In this way, the backup thread can revive misappropriated data chunks when it is part of new incoming backup operation.

FIG. 4 illustrates an example data deletion process 400, according to some embodiments. Data deletion can indicates a file system state where the GC thread is cleaning up garbage data chunks. In step 402, while in the data deletion state, a backup thread, while processing an ongoing backup, can encounter an existing data chunk. The backup thread can considers it to be potential garbage data chunk which can get cleaned up by GC thread. So it starts protecting all such chunks. (This can be optimized by making backup thread to lookup for the backup chunk in "Eraser" database.) For example, in step 404, the backup thread acquires a 'READ' lock on the data chunk file. In step 406, the backup thread adds a hardlink to the data chunk file in a temporary location. By adding the hardlink to a data chunk, the backup thread gives new life to existing data chunk and conveys that GC not to clean up this data chunk. In step 408, if the READ lock is granted in delayed mode (e.g. to pending reader, see chunk locking discussion infra for an example), then in the delayed mode, GC has cleaned up the data chunk, before backup thread can protect it. In that case this data chunk is treated as a 'new' data chunk. The 'new' data chunk is then created in the dedupe file system.

In step 410, the GC thread iterates the eraser database. For every data chunk in the database, proceed step 412. In step 412, the GC thread can acquire WRITE lock. If the lock is granted, GC thread checks the link count of the data chunk file. If the link count is two (2), then the GC ignores that data chunk file. If the link count is one (1), then no backup thread has protected this chunk. The GC first removes the respective data chunk entry from the dedupe file system's database. After successful deletion of the data chunk from the dedupe file system's database, the GC removes the data chunk from the file system. In step 414, the GC thread iterates the ExpiredBI database. For every backup image remove the corresponding metadata information from the dedupe file system.

Figure 5:
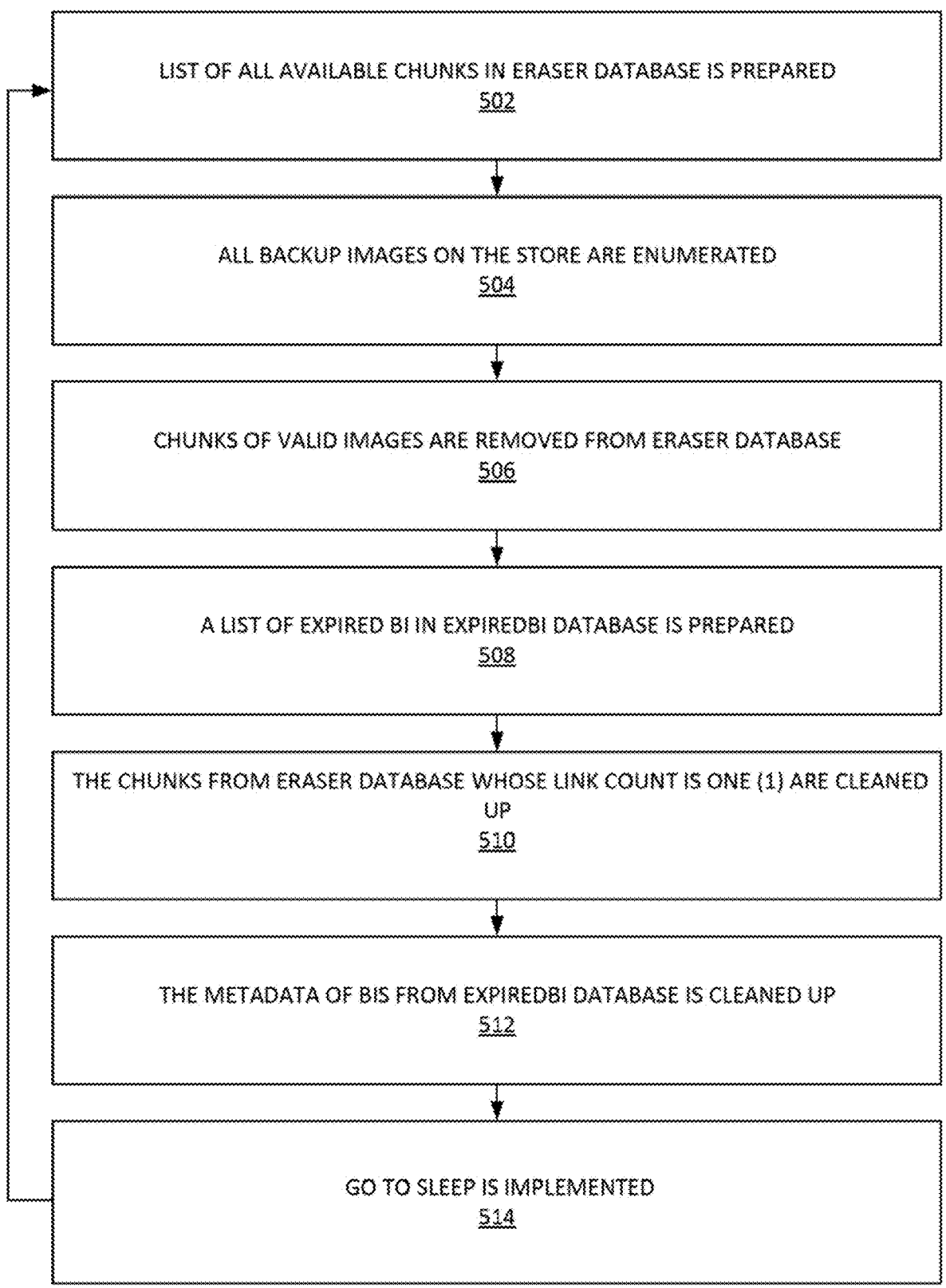
FIG. 5 illustrates an example of a GC thread state diagram, according to some embodiments.

FIG. 5 illustrates an example of a GC thread state diagram, according to some embodiments. In step 502, list of all available data chunks in eraser database is prepared. In step 504, all backup images on the store are enumerated. In step 506, chunks of valid images are removed from eraser database. In step 508, a list of expired backup images in ExpiredBI database is prepared. In step 510, the data chunks from eraser database whose link count is one (1) are cleaned up (e.g. removed). In step 512, the metadata of backup images from ExpiredBI database is cleaned up. In step 514, the go to sleep operation is implemented.

Figure 6:
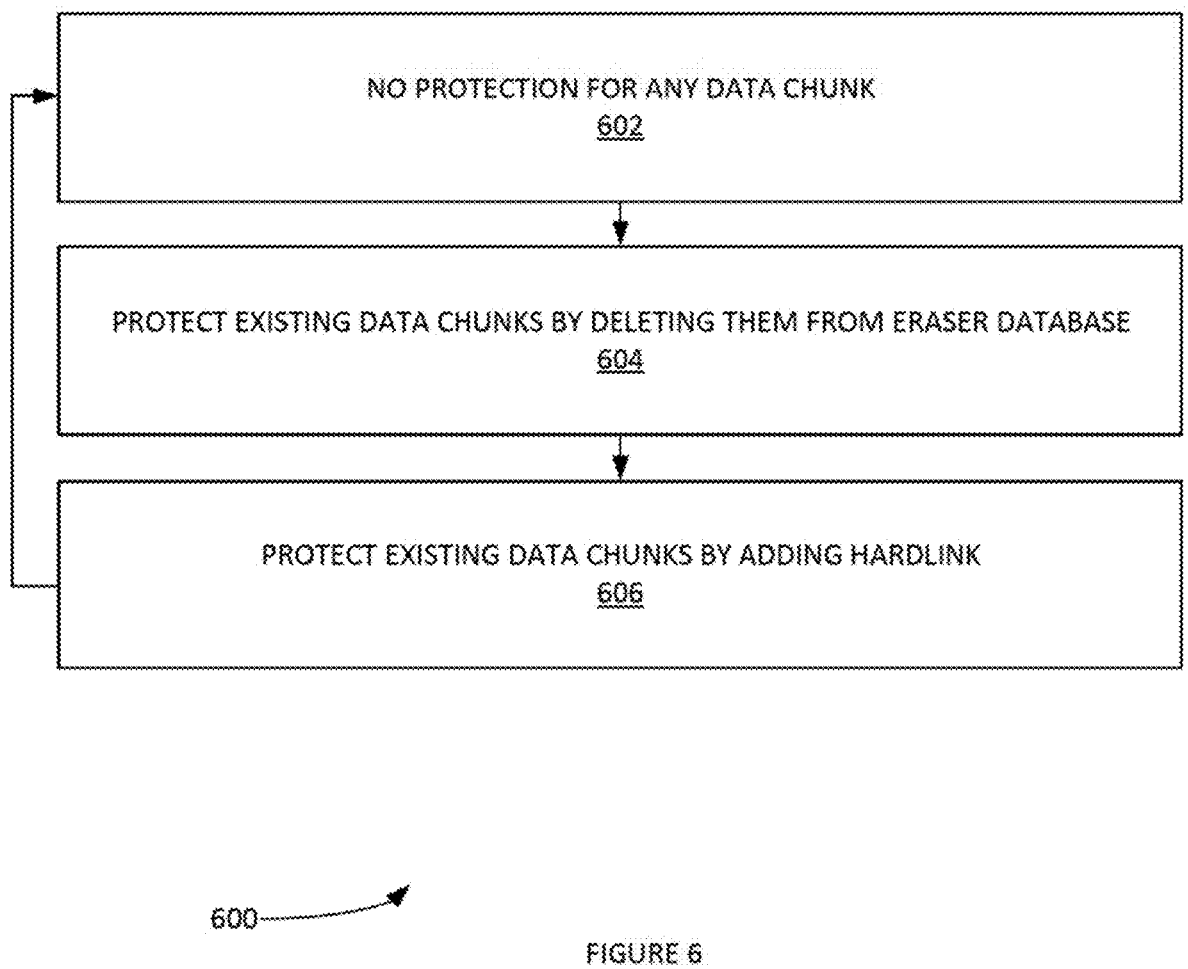
FIG. 6 illustrates an example of a backup thread state diagram, according to some embodiments.

FIG. 6 illustrates an example of a backup thread state diagram, according to some embodiments. In step 602, no protection for any data chunk is implemented. In step 604, existing data chunks are protected by deleting them from eraser database. In step 606, existing data chunks are protected by adding hardlink.

Figure 7:
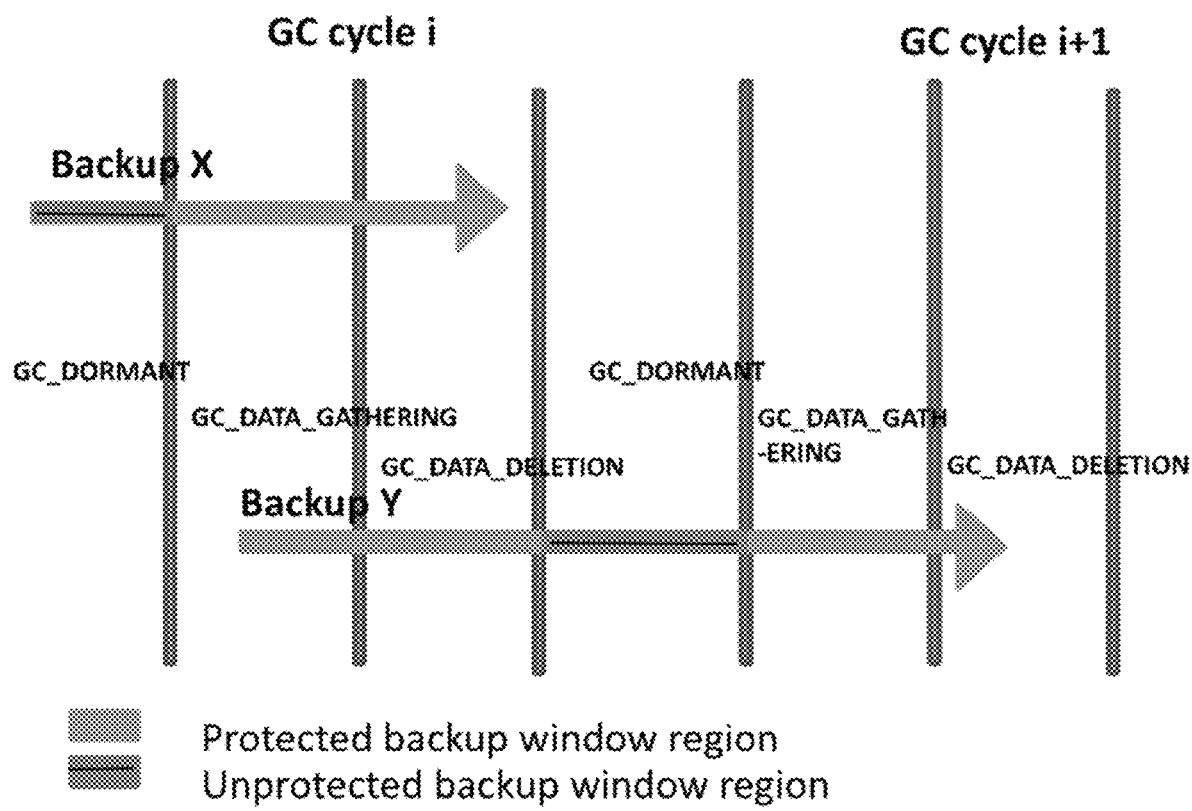
FIG. 7 illustrates an example a partially protected backup issue, according to some embodiments.

FIG. 7 illustrates an example a partially protected backup issue 700, according to some embodiments. From the Backup Thread's state diagram below things are clear. In ongoing backup jobs the data chunks are protected when dedupe file system is in data gathering or data deletion state. However, the ongoing backup may run without any protection for the data chunks when dedupe file system is in dormant state. Consider a backup X that was started when dedupe file system was in dormant state and still in progress when dedupe file system's state changed to data gathering by GC thread. Protection of already existing chunks refreshed by backup X when the dedupe file system was in dormant state cannot be guaranteed. Consider a backup Y that started when dedupe file system's state was data gathering or data deletion and continued until the GC thread wakes up for the next iteration and changes the dedupe file system's state to data gathering state. Then for backup Y, the data chunks when dedupe file system was in dormant state nay not be protected.

Figure 8:
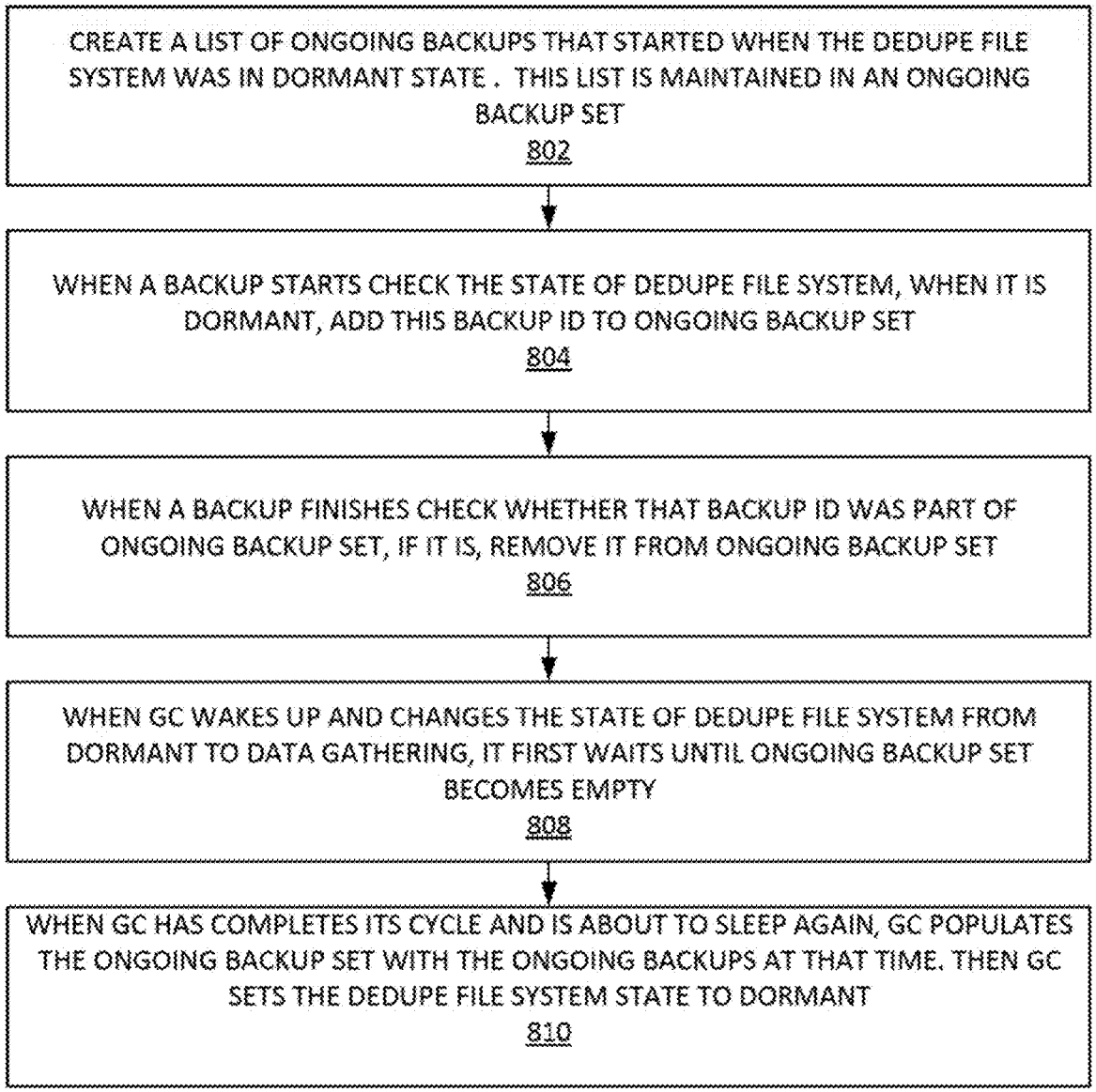
FIG. 8 illustrates an example synchronization algorithm, according to some embodiments.

FIG. 8 illustrates an example synchronization algorithm 800, according to some embodiments. Synchronization algorithm 800 can be implemented to solve the issues present in FIG. 7 supra. For example, in step 802, a list of ongoing backups which started when the dedupe file system was in dormant state. This list is maintained in ongoing backup set. In step 804, when a backup is started, the state of dedupe file system is checked. When it is dormant, a backup identifier is added to ongoing backup set. In step 806, when a backup operation finishes, it is checked if that backup identifier was part of ongoing backup set. If it is, it is removed from the ongoing backup set. In step 808, to solve the problem of backups which falls under the category of backup X (see FIG. 7 supra), when GC wakes up and changes the state of dedupe file system from dormant to data gathering, it first waits until ongoing backup sets become empty. Then it starts preparing the list of garbage data chunks. When the GC is in progress ongoing backup set is always empty. In step 810, to solve the problem of backups which falls under category of backup Y, when GC has completes its cycle and is about to sleep again, GC populates the ongoing backup set with all the ongoing backups at that time. Then GC sets the dedupe file system state to dormant. After that all subsequent backups will be added to ongoing backup set till GC wakes up for the next iteration. AT that time it will wait till ongoing backup set becomes empty.

In some embodiments, as discussed supra, in one example design there may be sixty-four (64) backup threads which, while processing every backup data chunk, read the state of dedupe file system and make decisions for protection of said data chunks based on the state of dedupe file system. A single GC thread can changes the state of dedupe file system in every cycle to implement garbage collection. When a backup thread reads the state of the dedupe file system and selects a decision route, then the state of dedupe file system should not be changed until that backup thread finishes processing. Similarly when GC thread decides to change the state of dedupe file system, it should be determined that no backup thread at that point in time is processing a data chunk. Thus dedupe file system's state changing operation can be viewed as "Reader-Writer" synchronization problem, where backup threads are Readers and GC thread is Writer. When a GC thread is active, it can have impact on backup window, since a backup in that period may need extra processing for protecting already existing chunk. To have the minimum impact of GC thread on backup window, the GC thread can maintain the running time as minimum as possible. To keep the GC running time minimum, GC thread should never be starved by backup threads to change the state of dedupe file system. Accordingly, in these synchronization problem, the priority can be provided to Writers and/or write operations.

When dedupe file system state is data deletion state, the GC thread and/or backup threads can solve the synchronization issue by manipulating the hard link count of the data chunk file. For the manipulation of hard links locking the data chunk file is important. A light-weight special-purpose file locking mechanism can be implemented for multi-threaded processes. For example, a lock implementation can use a simple unordered map which stores <chunk-name-lock type> as the key-value pair. For example, one implementation can support three example types of locks: CHUNK_NONE_LOCK 'N'; CHUNK_READ_LOCK 'R'; and/or CHUNK_WRITE_LOCK 'W'. Backup threads can acquire CHUNK_READ_LOCK to protect the data chunk by adding a hardlink to the chunk file. The GC thread acquires CHUNK_WRITE_LOCK on data chunk file and check the link count of the data chunk file, if it is not greater than 1, it deletes the file. The rules for acquiring the locks are as follows. CHUNK_NONE_LOCK: data chunk file is not locked currently. If a backup thread requests CHUNK_READ_LOCK it is granted. If a GC thread requests CHUNK_WRITE_LOCK it is granted. CHUNK_READ_LOCK: data chunk file is locked by a backup thread to make its link count 2. If another backup thread requests CHUNK_READ_LOCK, it is not granted. Since the data chunk file in question is already getting protected by the backup thread holding the CHUNK_READ_LOCK. So there is no point making another backup thread wait to protect the same data chunk.

If the GC thread requests CHUNK_WRITE_LOCK, it is not granted. Because GC thread is demanding CHUNK_WRITE_LOCK to delete the data chunk file. But the same file is currently getting protected by a backup thread. GC is not allowed to delete a data chunk file which has link count 2. So even if the CHUNK_WRITE_LOCK is granted for this file in future, GC cannot delete the file.

CHUNK_WRITE_LOCK: data chunk file is locked by a GC thread to delete it. If a backup thread requests CHUNK_READ_LOCK, then the locking system checks if it is the first backup thread requesting CHUNK_READ_LOCK for this data chunk after it has granted GC thread CHUNK_WRITE_LOCK. In that case the locking system makes this backup thread a "pending reader" and grants it CHUNK_READ_LOCK once the GC thread has released the CHUNK_WRITE_LOCK. Once this "pending reader" acquires the CHUNK_READ_LOCK it first checks whether GC thread has deleted the data chunk file. If the data chunk file is deleted, it rewrites the data chunk file with the data chunk available with it. If a backup thread requests CHUNK_READ_LOCK, then the locking system checks if the data chunk has any "pending reader". If that data chunk has "pending reader", then request of this backup thread is not granted. Since the locking system has already appointed one backup thread as a care taker for this data chunk. So there is no point making another thread wait to protect the same data chunk. Once a data chunk is locked with CHUNK_WRITE_LOCK, it can never get the request for another CHUNK_WRITE_LOCK. Since there is only once GC thread running in the system which can request for the CHUNK_WRITE_LOCK.

Exemplary Systems

Figure 9:
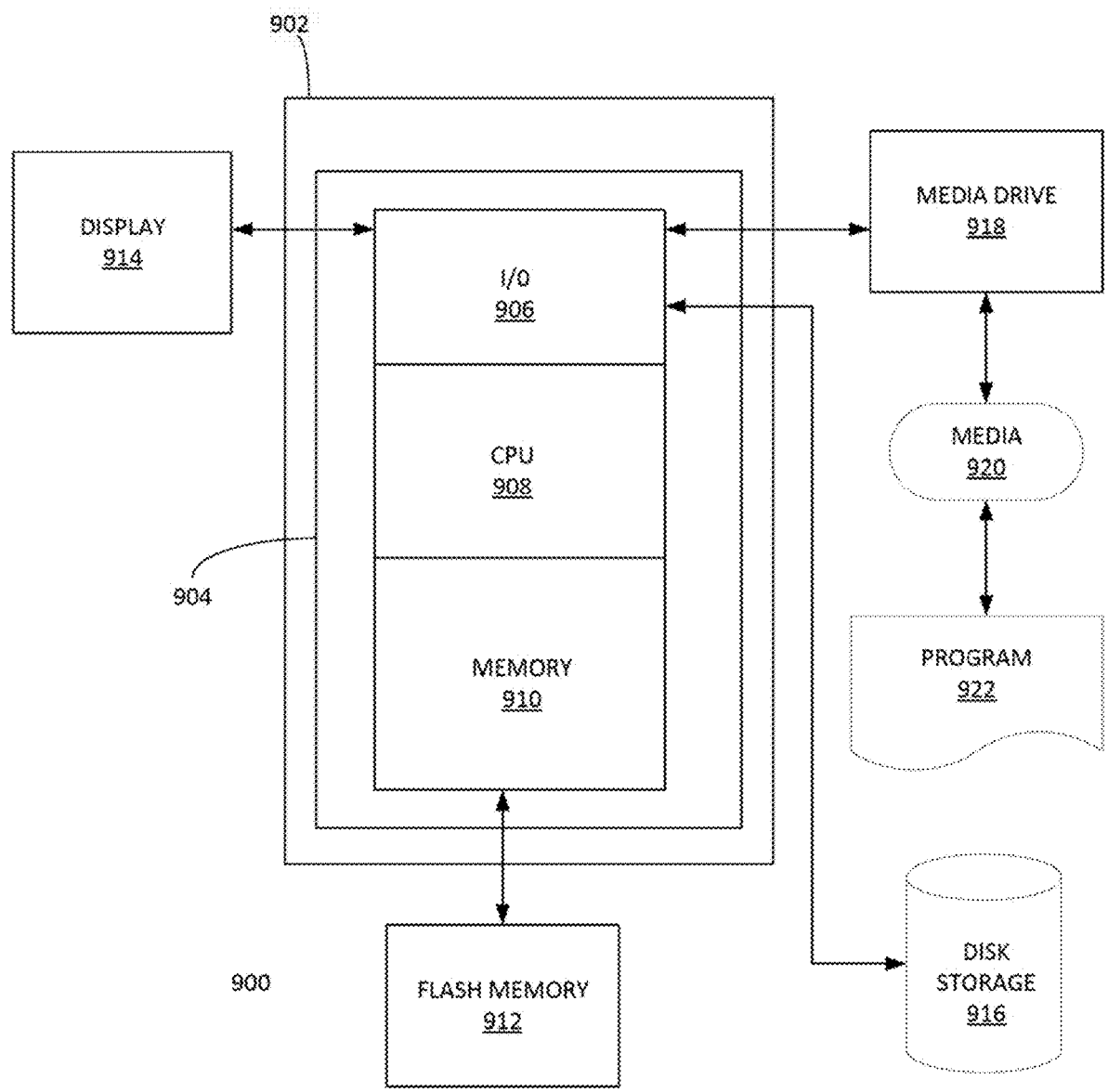
FIG. 9 depicts an exemplary computing system that can be configured to perform any one of the processes provided herein.

FIG. 9 depicts an exemplary computing system 900 that can be configured to perform any one of the processes provided herein. In this context, computing system 900 may include, for example, a processor, memory, storage, and I/O devices (e.g., monitor, keyboard, disk drive, Internet connection, etc.). However, computing system 900 may include circuitry or other specialized hardware for carrying out some or all aspects of the processes. In some operational settings, computing system 900 may be configured as a system that includes one or more units, each of which is configured to carry out some aspects of the processes either in software, hardware, or some combination thereof.

FIG. 9 depicts computing system 900 with a number of components that may be used to perform any of the processes described herein. The main system 902 includes a motherboard 904 having an I/O section 906, one or more central processing units (CPU) 908, and a memory section 910, which may have a flash memory card 912 related to it. The I/O section 906 can be connected to a display 914, a keyboard and/or other user input (not shown), a disk storage unit 916, and a media drive unit 918. The media drive unit 918 can read/write a computer-readable medium 920, which can contain programs 922 and/or data. Computing system 900 can include a web browser. Moreover, it is noted that computing system 900 can be configured to include additional systems in order to fulfill various functionalities. Computing system 900 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic dedupe area communication protocol, etc.

It is noted, after the system is recovered on the cloud by the cloud appliance, the cloud-appliance can be configured to regularly backup the recovered system running on the cloud. Accordingly, multiple images corresponding to the system running on the cloud can be captured and stored by the cloud appliance. The cloud-appliance can detect the unique data chunks of these backup images and uploads these data chunks to the cloud storage. The cloud-appliance can integrate with the cloud infrastructure APIs to discover any other systems running in the cloud. The cloud-appliance can be configured to regularly backup these systems (e.g. are manually created in the cloud).

It is noted, that after the system is recovered and running on the cloud, the cloud-appliance can back up the system regularly. The system can upload unique data chunks to cloud storage. In the event a user would like a server image back on the on-site premises, the following steps can be performed. At the location where the customer wants the image back, the user can power-on another on-site appliance and configure it to regularly download new unique data chunks from the cloud storage. When all the unique data chunks for an image are downloaded, the on-site appliance can restore this image.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized system of concurrently synchronizing a garbage collection thread and a writer threads in a dedupe file system in a data gathering state comprising:
    a processor configured to execute instructions;
    a memory containing instructions when executed on the processor, causes the processor to perform operations that:
        while the dedupe file system is in a data gathering state,
        a garbage collector thread concurrently working with writer threads, generate, with at least one processor, a garbage list of data chunks that are candidates for deletion by a garbage collector thread, wherein the garbage collector thread enumerates all backups on the data store, and wherein the garbage collector thread traverses a list of valid backups and removes any data chunks of the list of valid backups from an eraser database of the dedupe file system; and
        with the writer threads, referring to the garbage list of data chunks while ingesting data by:
            matching the data chunks with those present in the garbage list;
            filtering out the matched data chunks from garbage list of data chunks;
            setting, with the garbage collector thread, the dedupe file system to a data deletion state; and
            setting the writer threads to ingest data into the dedupe file system in synchronization with garbage collector thread.

2. A computerized system of synchronizing a garbage collection thread and a writer threads in a dedupe file system in Data deletion state comprising:
    a processor configured to execute instructions;
    a memory containing instructions when executed on the processor, causes the processor to perform operations that:
        provide one or more writer threads concurrently working with garbage collector thread, referring to the garbage list of data chunks while ingesting data by:
            matching the data chunks with those present in the garbage list;
        for the matched data chunk add one or more hard links to the data chunk file in a temporary location, and wherein the hard links lock the data chunk file from deletion, wherein the hard links are a directory entry that associates a name with a data chunk file on a file system of the computerized system;
        with a garbage collector thread:
        iterate through the garbage list; and
        obtain an exclusive access of each data chunk and delete any data chunk that is not marked by the one or more writer threads as having two hard links.

* * * * *